Oct. 16, 1956  A. SCHMID  2,766,600
TORQUE CONVERTER, IN PARTICULAR FOR WINDING ROLLS AND THE LIKE
Filed April 10, 1951
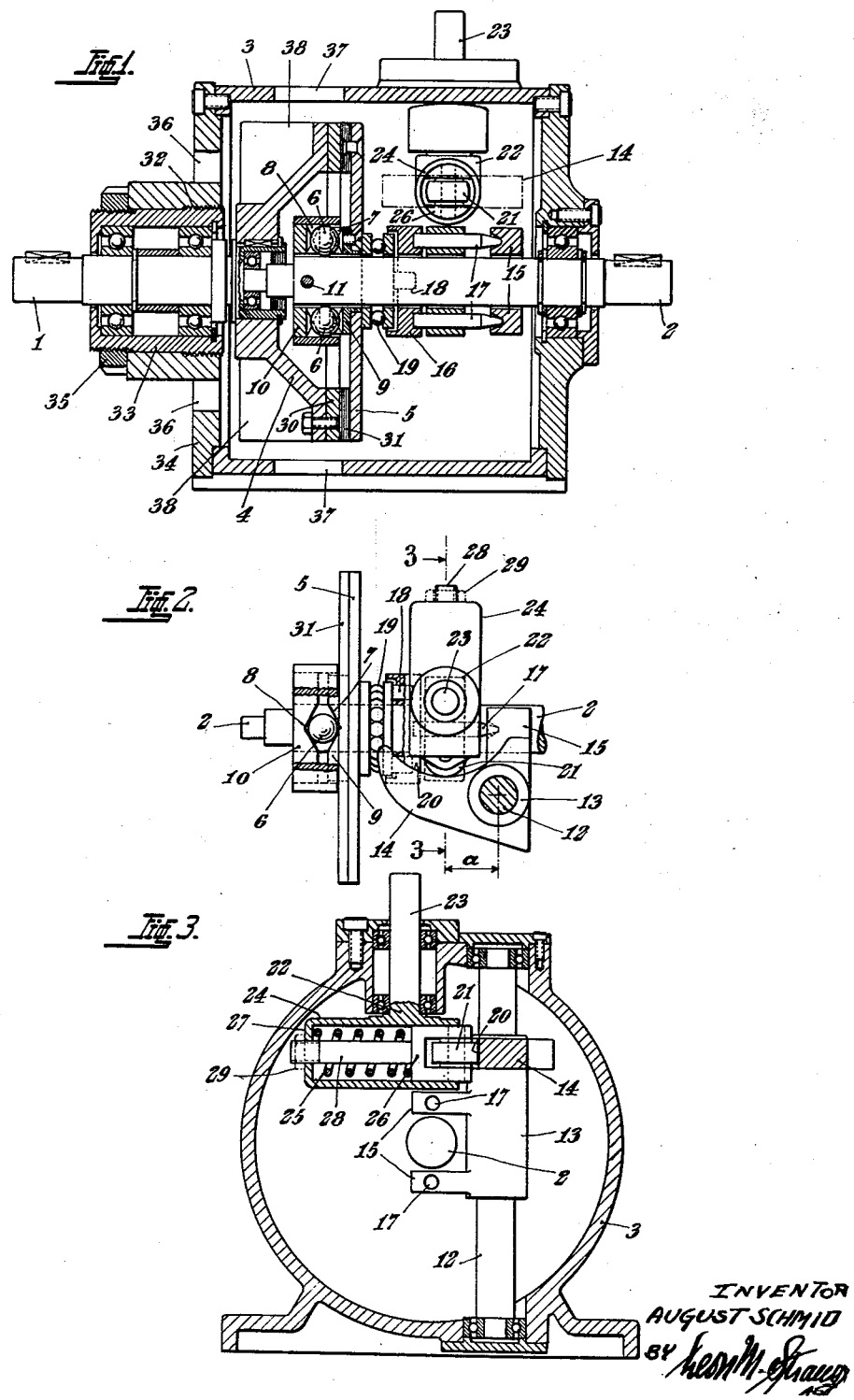
INVENTOR
AUGUST SCHMID

United States Patent Office 2,766,600
Patented Oct. 16, 1956

2,766,600

TORQUE CONVERTER, IN PARTICULAR FOR WINDING ROLLS AND THE LIKE

August Schmid, Schwerzenbach, Switzerland, assignor to Staniolfabrik Burgdorf A. G., Burgdorf, Switzerland Application April 10, 1951, Serial No. 220,226

Claims priority, application Switzerland April 14, 1950

3 Claims. (Cl. 64—30)

The invention refers to a torque converter, in particular for winding rolls and like operations in which a pull as uniform as possible is to act on the material to be wound in spite of the varying diameter produced during winding of the roll.

The torque converter according to the invention has a friction clutch between the input shaft and the output shaft and it is an object of the invention to provide means affording the selective adjustment of the torque at the output shaft to a value from zero to that of the input torque, a lever being provided having a lever arm of constant length effecting the contact pressure on the friction parts of the clutch and a control member adjustable independently of the magnitude of the contact pressure, which member acts with a predetermined force upon the lever in a selectively adjustable distance from the pivot axis of the lever.

An object of the invention is to provide a control member which is pivotally mounted on a shaft arranged parallel to the lever pivoting axis and which is in contact with the lever along a circular-shaped surface of the lever, the axis of the circular-shaped surface coinciding at least approximately with the pivoting axis of the control member.

Further objects will become apparent from the detailed description of an embodiment of the present invention which will now be described by way of example with reference to the accompanying drawing, in which:

Fig. 1 shows a vertical sectional view through the torque converter.

Fig. 2 is a partial top plan view, and

Fig. 3 shows a vertical cross-section of the device taken along line 3—3 of Fig. 2.

The input shaft 1 and the output shaft 2 of the torque converter illustrated are mounted coaxially in the housing 3 and carry clutch means comprising clutch plates 4 and 5, respectively, accommodated in the housing 3. The plate 4 is rigidly secured to the input shaft 1, whereas the plate 5 is to a limited extent rotatable relative to the output shaft 2 and axially displaceable thereon. The plate 5 rotates the output shaft 2 through a ball notch retainer device having two diametrically disposed balls 6 each engaging in two oppositely arranged notches 7 and 8 of the two rings 9 and 10, the ring 9 being secured to the plate 5 and the ring 10 being pivotally mounted on the shaft 2 by means of a pin 11. On relative rotation of the two rings 9 and 10 to each other the balls 6 are displaced on the inclined surfaces defining said notches 7 and 8 and arranged at a predetermined angle to the direction of rotation and thus cause an axial displacement of the plate 5.

For effecting the axial contact pressure of the plate 5 upon the plate 4 and thereby actuating the clutch there is a lever 13 secured to a pivot shaft 12 (Fig. 3) vertically mounted in the housing 3 which lever 13 on the one hand comprises the lever arm 14 subjected to the pressure of a spring force and on the other hand a pair of lever arms 15 extending above and below the shaft 2 and acting on the plate 5 through a carrier spider 16 provided with two pairs of supporting pins or like thrust means 17 and 18, respectively, arranged parallel to the shaft 2 and off-set from each other by 90° and through an axial bearing 19. Thus, the elements 15 to 19 may be thought of as the actual clutch actuating means. The lever arm 14 has a cylindrical surface 20 arranged with its axis parallel to the pivot axis of the lever means 13, on which surface 20 can roll a pressure roller or like bearing member 21 mounted in a control member 22 for transmitting the above mentioned spring force upon the lever arm means 14, said control member 22 being provided with a pivoting shaft 23 mounted coaxially with the axis of the cylindrical surface 20 in the housing 3. The pivoting shaft 23 projects upwardly out of the housing 3 and carries at its lower end a cylindrical sleeve 24 having its axis disposed radially to the cylindrical surface 20, said sleeve 24 enclosing a coil spring 25 pressing against a piston 26 arranged axially displaceable in said sleeve 24, said piston 26 carrying at its outer end the pressure roller 21 and having at its inner end a screw bolt 28 which extends axially through a hole in the end wall 27 of the sleeve 24. The parts just described may be designated as rotatable torque varying or control means. Only during assembly of the control member 22 a bolt nut 29 is screwed on to the end of said screw bolt thus enabling the piston 26 to be drawn into the sleeve 24 against the action of the spring 25. After assembly the nut 29 is again removed so that the spring 25 can force the pressure roller or bearing member 21 with a constant predetermined force against the cylindrical surface 20 of the lever arm means 14.

According to the distance $a$ between the pivot axis of the lever 13 and the direction of the spring force applied to the lever arm 14 by the control member 22, which distance changes due to the pivotal displacement of said control member 22 with the pivoting shaft 23, there results a torque of greater or smaller magnitude and therewith a correspondingly changeable pressure force at the points of application of the supporting pins 17 on the pair of lever arm means 15, the distance of said supporting pins 17 from the pivot axis of the lever means 13 being constant or unchangeable. A replaceable friction ring 30 and 31, respectively, is secured on the two clutch plates 4 and 5 as linings. Preferably the friction ring 30 consists of nitralloy steel and the friction ring 31 of a friction material highly resistant to wear, as rings of these materials give more favourable results in coaction and have a longer life than chilled cast iron plates.

To enable the axial readjustment of the plates required from time to time due to the continuous wear of the friction linings 30, 31, the input shaft 1 is mounted in a sleeve 33 provided with an outside thread, said sleeve being screwed into the lid 34 of the housing and locked in position by means of a lock nut 35.

For creating an air flow entering through the orifices 36 provided in the lid 34 of the housing and issuing through the orifices 37 provided in the housing 3 for the purpose of cooling the friction plates fan blades 38 are provided on the plate 4. When the torque at the input shaft 1 remains constant and the position of the control member 22 remains unchanged the torque at the output shaft 2 is practically constant, in spite of the alteration of the coefficient of friction due to heating, because the ball notch retainer device 6 to 11 automatically effects the necessary compensation with regard to the contact pressure of the plate 5 against the plate 4, the contact pressure increasing or decreasing more or less rapidly with the increase and the decrease of the coefficient of friction, respectively, according to angle of inclination of the inclined surfaces of the notches 7, 8 relative to the radial plane. In case of an unequal wear of the friction linings the above-mentioned elements 16 to 18 and the ball notch retainer device 6 to 11 functioning as a universal joint to a limited extent ensure an automatic adjustability of the friction plate 5.

The adjustment of the control member 22 for the purpose of selectively altering the torque of the output shaft 2 is effected by the pivoting of the pivot shaft 23 which, by way of example, may be rotated by a linkage (not shown) actuated by an arm gauging the radius of the roll, spool or the like being wound. The force required for pivoting the pivot shaft 23 is independent of the magnitude of the contact pressure and therefore relatively small, since the cylindrical surface 20 of the lever arm 14 coacting with the control means 21—22 is at all times in a practically coaxial position with the pivot shaft 23. If the axis of the sleeve 24 of the control member is pivoted into the plane through the axis of the lever 13 and the pivot axis of the control member, the pressure of the spring 25 creates no longer a torque on the lever 13, the contact pressure of plate 5 against plate 4 disappears and the friction clutch becomes released.

Having thus described the invention, what is claimed as new and desired to be secured by Letters Patent, is:

1. A torque regulator for controlling the torque transmitted from an input shaft to an output shaft; comprising clutch means having a first clutch part fixed to said input shaft and a second clutch part frictionally engageable with said first clutch part and arranged on said output shaft for both rotational and axial displacements relative thereto, ball notch retainer means including two adjacent ring members having notches defined by inclined surfaces facing one another, and ball means disposed between said ring members and within said notches, one of said ring members being fixed to said second clutch part, the other ring member being pivotally supported by said output shaft, whereby upon rotation of said input shaft together with said first clutch part and upon consequent entrainment of said second clutch part into rotation wedging of said ball means between said inclined notch surfaces of said ring members is effected and tends to engender axial displacement of said second clutch part along said output shaft and away from said first clutch part, control means disposed for rotation about an axis substantially perpendicular to the axis of said output shaft, a pivot shaft having an axis disposed substantially parallel to said axis of rotation of said control means, lever means fixed to said pivot shaft and provided with a cylindrical surface having a center of curvature substantially coinciding with said axis of rotation of said control means, said control means including a bearing member contacting said cylindrical surface with predetermined force, and clutch actuating means extending parallel to said output shaft and operatively connecting said lever means with said second clutch part, whereby the force applied to said cylindrical surface of said lever means by said bearing member is transmitted as a linear force to said second clutch part by said clutch actuating means to thereby prevent said axial displacement of said second clutch part, rotation of said control means to vary the location of contact between said bearing member and said cylindrical surface effecting corresponding variation of said linear force.

2. A torque regulator according to claim 1, further comprising means for axially adjusting said input shaft together with said first clutch part relative to said second clutch part.

3. A torque converter for use in connection with an input shaft and an output shaft; comprising a housing, a clutch accommodated within said housing and having first and second friction parts engageable with each other, said first friction part being fixed to said input shaft, said second friction part being carried by said output shaft and displaceable both longitudinally and rotationally thereon, ball notch retainer means including two adjacent ring members having notches defined by inclined surfaces facing each other, one of said ring members being fixedly connected to said second friction part, the other ring member being connected to said output shaft for pivotal movement about an axis substantially perpendicular to the longitudinal axis of said output shaft, ball means disposed within said notches, thrust means extending parallel to said output shaft and engaging said second friction part, a pivot shaft arranged with its longitudinal axis at right angles to said axis of said output shaft, lever means fixed to said pivot shaft and provided with first and second lever arm means extending transversely to said pivot shaft and at an angle to one another, said first lever arm means engaging said thrust means, said second lever arm means being provided with a cylindrical surface, and torque control means arranged for rotation about an axis parallel to said axis of said pivot shaft, said torque control means including a spring-biased roller member bearing against said cylindrical surface with a predetermined force, the center of curvature of said cylindrical surface coinciding substantially with said axis of rotation of said torque control means, whereby displacement of said second friction part along said output shaft due to wedging action of said ball means in said notches is counteracted by a linear force exerted on said second friction part by said thrust means under the action of said first lever arm means in response to said predetermined force exerted on said cylindrical surface of said second lever arm means by said spring-biased roller member, rotation of said control means causing change of the location of contact between said roller member and said cylindrical surface and effecting thereby corresponding variation of said linear force.

References Cited in the file of this patent

UNITED STATES PATENTS

| 1,089,171 | Wigginton | Mar. 3, 1914 |
| 1,437,412 | Girling | Dec. 5, 1922 |
| 1,472,855 | Schneider | Nov. 6, 1923 |
| 1,739,947 | Chilton | Dec. 17, 1929 |
| 2,182,926 | Manz et al. | Dec. 12, 1939 |
| 2,214,901 | Griffin | Sept. 17, 1940 |
| 2,268,373 | Cartlidge | Dec. 30, 1941 |

FOREIGN PATENTS

| 386,837 | Great Britain | 1933 |